(12) United States Patent
Yoshida et al.

(10) Patent No.: US 6,880,628 B2
(45) Date of Patent: Apr. 19, 2005

(54) HEAT EXCHANGER FOR FUEL CELL SYSTEM

(75) Inventors: Kazue Yoshida, Tokyo (JP); Hiroki Yoshioka, Tokyo (JP)

(73) Assignee: Calsonic Kansei Corporation, Tokyo (JP)

( * ) Notice: Subject to any disclaimer, the term of this patent is extended or adjusted under 35 U.S.C. 154(b) by 27 days.

(21) Appl. No.: 10/062,470

(22) Filed: Feb. 5, 2002

(65) Prior Publication Data

US 2002/0104645 A1 Aug. 8, 2002

(30) Foreign Application Priority Data

Feb. 7, 2001 (JP) .......................................... 2001-030674
Dec. 11, 2001 (JP) .......................................... 2001-377551

(51) Int. Cl.[7] ................................................. F28F 3/00
(52) U.S. Cl. ..................................................... 165/166
(58) Field of Search ................................. 165/167, 170, 165/166, 165, 153, 133

(56) References Cited

U.S. PATENT DOCUMENTS

| | | | | |
|---|---|---|---|---|
| 2,872,165 A | * | 2/1959 | Wennerberg | 165/166 |
| 4,570,700 A | * | 2/1986 | Ohara et al. | 165/170 |
| 5,366,004 A | * | 11/1994 | Garner et al. | 165/133 |
| 5,448,899 A | | 9/1995 | Ohara et al. | |
| 5,735,343 A | * | 4/1998 | Kajikawa et al. | 165/153 |
| 5,826,648 A | * | 10/1998 | Shimoya et al. | 165/153 |
| 6,318,456 B1 | | 11/2001 | Brenner et al. | |

FOREIGN PATENT DOCUMENTS

| | | |
|---|---|---|
| DE | 199 09 881 A1 | 9/2000 |
| JP | 57-73392 A | 5/1982 |
| JP | 61-110887 A | 5/1986 |
| JP | 2-171591 A | 7/1990 |
| JP | 4-177091 A | 6/1992 |
| JP | 2000-315508 | 11/2000 |
| WO | WO 96/20382 A1 | 7/1996 |
| WO | WO 00/36680 A1 | 6/2000 |

* cited by examiner

Primary Examiner—Ljiljana Ciric
(74) Attorney, Agent, or Firm—Foley & Lardner LLP

(57) ABSTRACT

A plurality of heat transfer tube elements 17 are laminated with outer fins disposed between the heat transfer tube elements 17 in order to form a core. A gas flows between the outer fins. A passage 24 allowing flow of a cooling medium in a direction orthogonal to the direction of gas flow is formed in each heat transfer tube element 17. The passage 24 has a large passage 31 having a large width disposed upstream with respect to the direction a of gas flow and a small passage group 33 comprising a plurality of small passages 32 being more narrow than the large passage 31 and being disposed downstream with respect to the direction of gas flow. This arrangement allows non-uniformity in the temperature distribution of a gas flow to be suppressed to a low level with a downsizing, low-weight and low-cost device.

13 Claims, 17 Drawing Sheets

US 6,880,628 B2

HEAT EXCHANGER FOR FUEL CELL SYSTEM

FIELD OF THE INVENTION

This invention relates to a heat exchanger for a gas reformed from fuel in a fuel cell system.

BACKGROUND OF THE INVENTION

An example of a fuel cell system is disclosed in JPA2000-315508 which generates power by electrochemical reactions of oxygen with a reformate gas produced by reforming fuel into a hydrogen-rich gas.

Carbon monoxide is contained in the reformate gas produced by the reformer which reforms fuel. Catalytic reactions in a carbon monoxide oxidizer are used in order to remove carbon monoxide before the reformate gas is supplied to the fuel cell due to the fact that the presence of carbon monoxide reduces power generation efficiency.

The temperature of the reformate gas immediately after being -produced in the reformer is approximately 300° C. Consequently, before the gas is supplied to the carbon monoxide oxidizer, it is required to reduce the temperature to approximately 100° C. by passing the gas through a heat exchanger. Catalytic reactions performed in the carbon monoxide oxidizer are performed efficiently only in a fixed temperature range about 100° C. The efficiency of reactions is reduced when the temperature of the reformate gas is either higher or lower than this fixed temperature range.

Furthermore it is necessary to homogenize the temperature distribution of the cooled reformate gas. When the temperature distribution of the reformate gas is not uniform, the overall reaction efficiency is reduced because areas of catalytic reactions having high efficiency exist together with the areas of low efficiency.

Although it is possible to homogenize the temperature distribution of the gas undergoing heat exchange by increasing the length of the heat exchanger core in the direction of gas flow, this increases the size of the heat exchanger.

Alternatively, although an agitator for gas in the downstream section of the heat exchanger has been proposed in order to homogenize the temperature distribution by mixing the gas, the provision of such a device is not preferable since it increases the complexity of the fuel cell system and increases manufacturing costs and the fuel cell size.

SUMMARY OF THE INVENTION

It is therefore an object of this invention to provide a small low-weight low-cost heat exchanger which reduces temperature deviations in a gas flow to a level which is negligible for practical purposes.

In order to achieve the above object the invention provides with a heat exchanger for use in a fuel cell system. The heat exchanger comprises heat transfer tube elements having an flat passage allowing flow of a cooling medium therein, outer fins retained between adjacent the heat transfer tube elements allowing flow of a gas there through and a core formed by laminating the heat transfer tube elements and the outer fins in order. The gas flows through the outer fins in a direction orthogonal to the direction of cooling medium flow which flows in the passage in each heat transfer tube element, and a passage in at least a section of the passage for cooling medium provided in each heat transfer tube element comprises a large passage and a small passage group disposed in parallel, the large passage having a large width and being provided upstream to the core with respect to the direction of gas flow, and the small passage group comprising a plurality of small passages being narrower than the large passage and being provided downstream of the core with respect to the direction of gas flow.

The details as well as other features and advantages of the invention are set forth in the remainder of the specification and are shown in the accompanying drawings.

DESCRIPTION OF THE PREFERRED EMBODIMENTS

Figure 1:
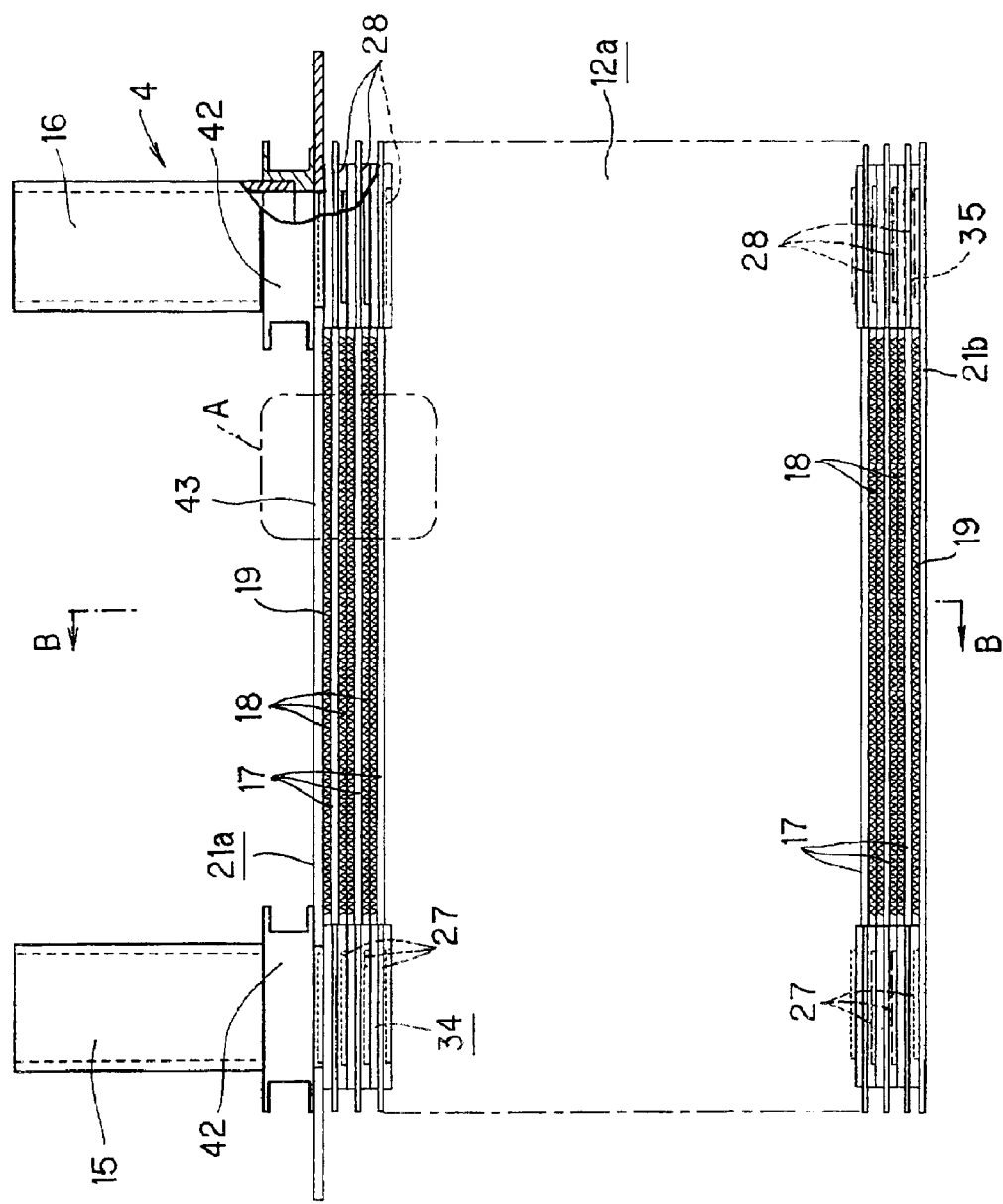
FIG. 1 is a front view with a section omitted of a first embodiment of this invention.

FIG. 1 to FIG. 12 show a fuel cell heat exchanger according to this invention. FIG. 1 to FIG. 5 show the actual structure of the heat exchanger and FIG. 6 to FIG. 12 show a simplified version thereof.

The heat exchanger 4 is used in order to cool a reformate gas transferred to a carbon monoxide oxidizer in a fuel cell system.

The core 12a of the heat exchanger 4 is formed by cross laminating a plurality of heat transfer tube elements 17 with a composite fin 18. The heat transfer tube elements 17 have a passage allowing flow of a cooling liquid as a cooling medium in an inner section. The composite fins 18 comprise an outer fin respectively disposed between adjacent heat transfer tube elements 17.

Figure 3:
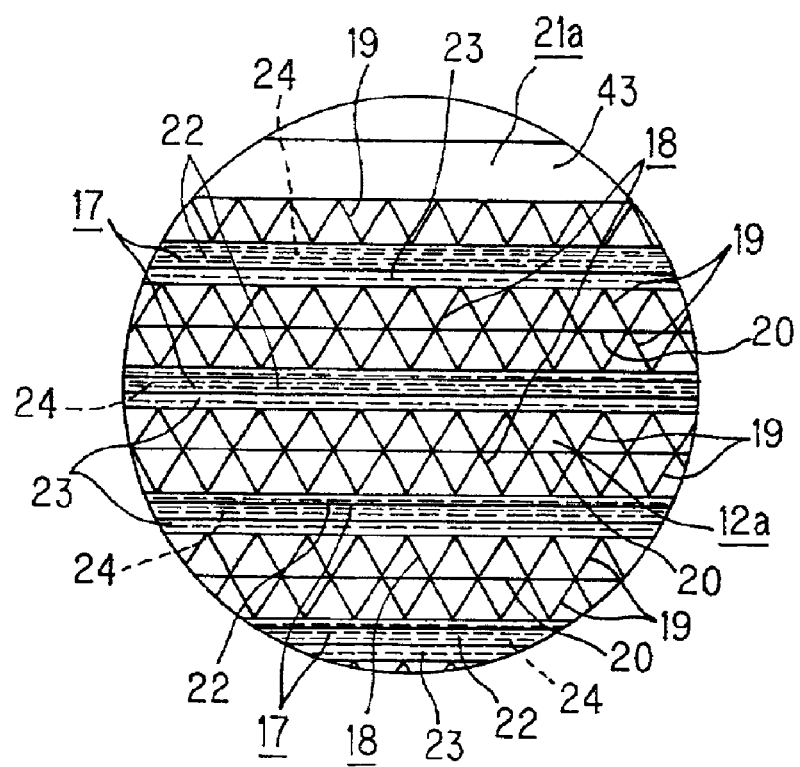
FIG. 3 is an enlargement of the section A of FIG. 1.
Figure 4:
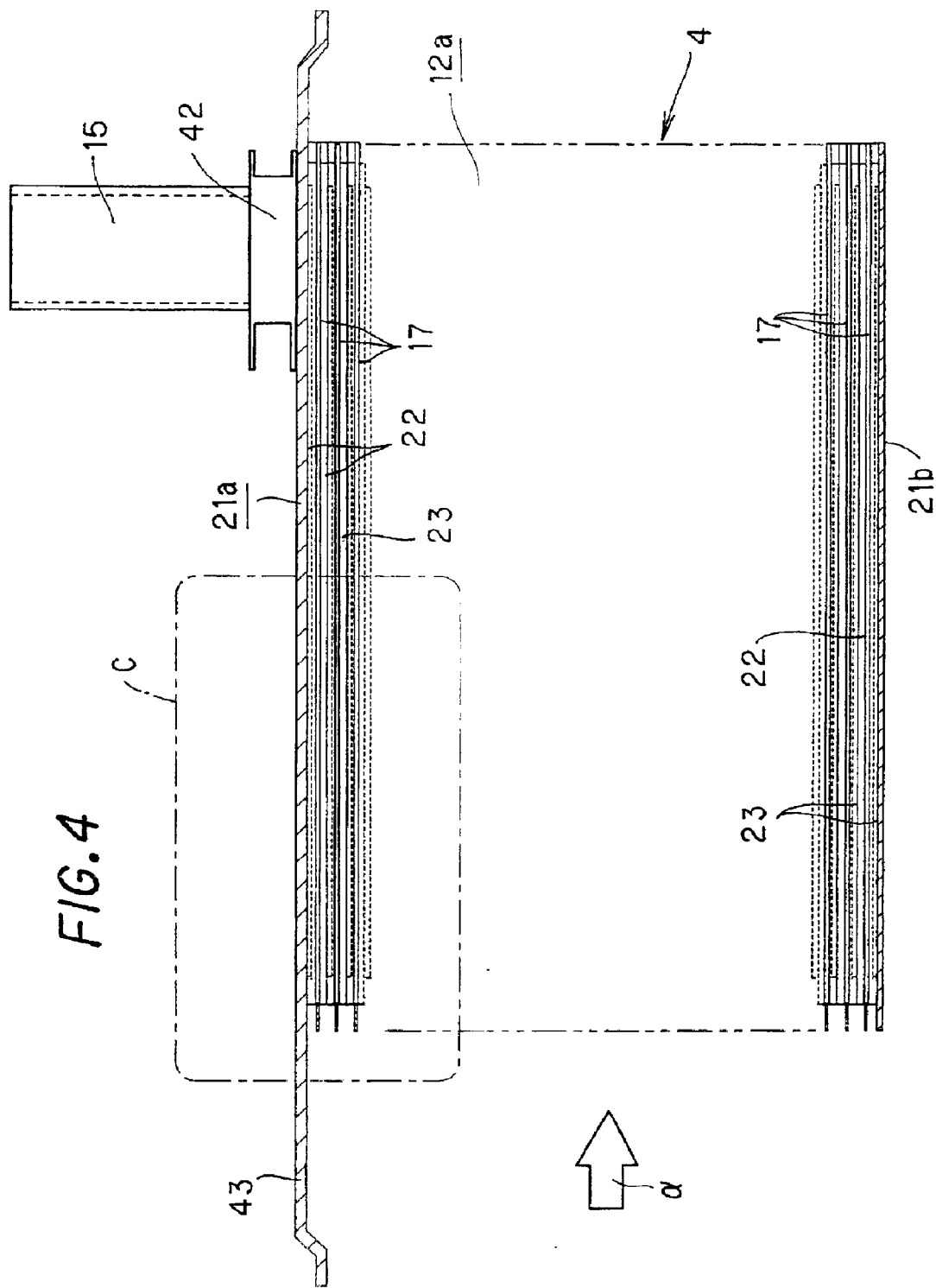
FIG. 4 is a sectional view along the line B—B of FIG. 1.
Figure 5:
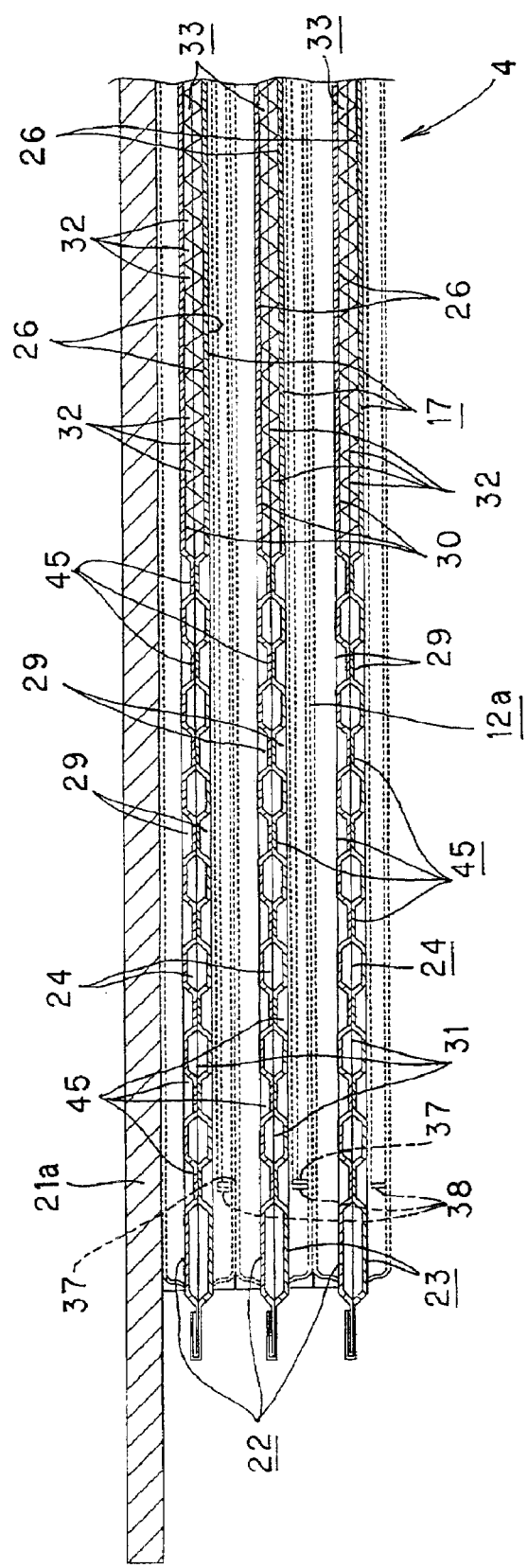
FIG. 5 is an expanded sectional view of the section C of FIG. 4.

As shown in FIG. 3, each composite fin 18 retains a single-layer plate fin 20 between a pair of corrugated fins 19, 19 and allows flow of the reformate gas in the inner section of the composite fin 18. Thus the cooling liquid flows in a direction which is orthogonal to the flow of the gas. It may be possible to provide a single corrugated fin 19 instead of the composite fin 18.

As shown in FIG. 1, a pair of side plates 21a, 21b is disposed on both vertical ends of the core 12a. Only a single corrugated fin 19 is disposed between the heat transfer tube elements 17 on the inner side of each side plate 21a, 21b.

As shown in FIG. 5 to FIG. 8, each heat transfer tube element 17 superimposes a pair of plates comprising a first metal plate 22 and a second metal plate 23 so that the indentation of the plates are facing. The plates 22, 23 are soldered together to make watertight contact. An flat passage 24 is formed in the inner section of each heat transfer tube element 17 to allow flow of cooling liquid.

A pair of deep elongated indentations 25, 25 (refer to FIG. 6 and FIG. 11) in a transverse direction (a direction orthogonal to the direction of flow of the cooling liquid) are provided on both ends of each metal plate 22, 23. A shallow indentation 26 is provided on a central section in order to connect the deep indentations 25, 25 on both sides. The shallow indentation 26 is adapted to be more shallow than the deep indentations 25, 25.

Figure 9:
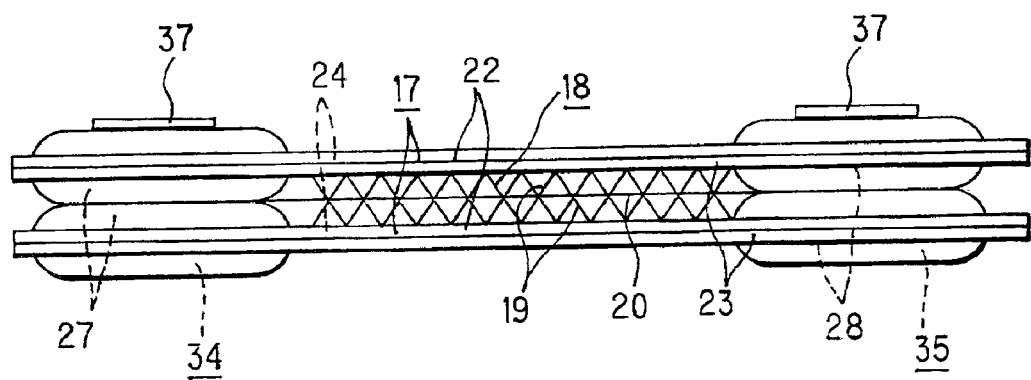
FIG. 9 is a schematic front view of a section of the core.

Each heat transferring tube element 17 respectively superimposes a first metal plate 22 on a second metal plate 23 so that the respective indentations, namely the deep indentations 25 and the shallow indentations 26 are facing. As also shown in FIG. 9, a first tank 27 and a second tank 28 are formed in a section of each deep indentation 25 and a passage 24 is formed in a section of the shallow indentation 26. The passage 24 connects the first tank 27 and the second tank 28 in order to allow flow of cooling liquid therebetween.

Figure 6:
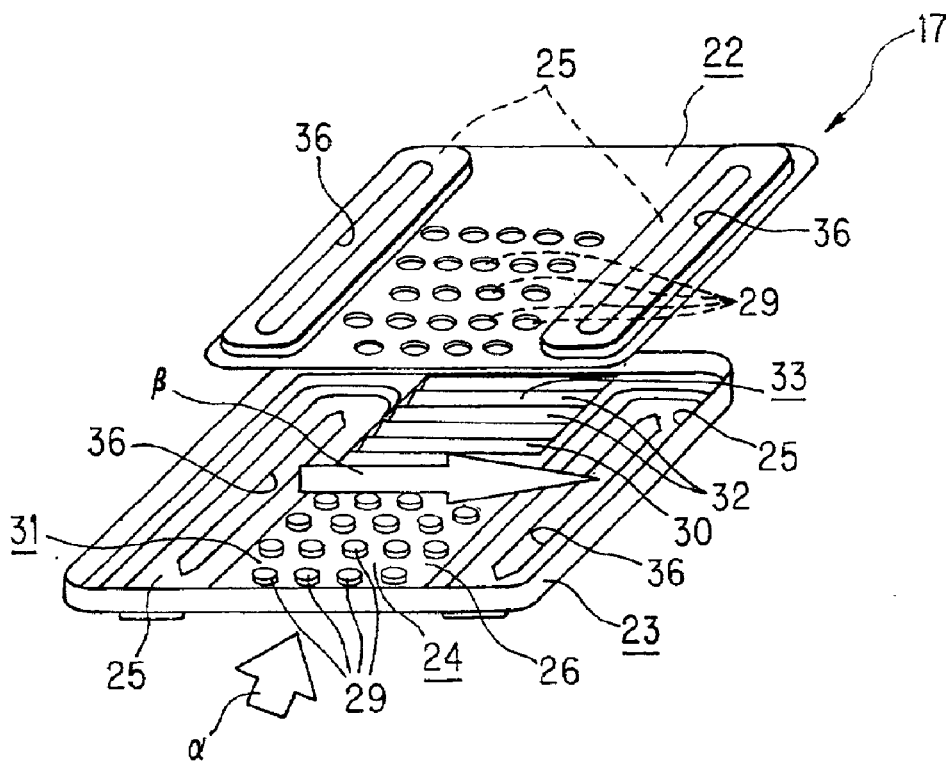
FIG. 6 is a schematic exploded perspective view of heat transfer tube elements.
Figure 7:
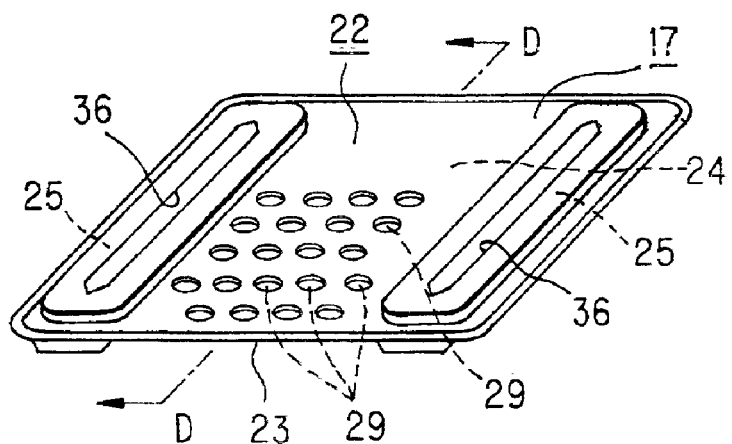
FIG. 7 is a schematic perspective view of various heat transfer tube elements.
Figure 8:
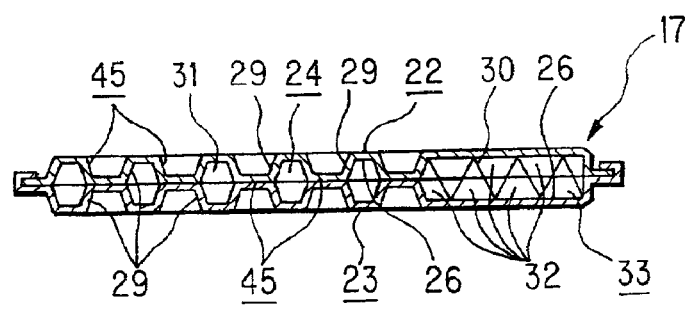
FIG. 8 is a sectional view along the line D—D of FIG. 7.

This invention is characterized by the structure of the passage 24. As shown in FIG. 6, multiple projections 29, 29 are formed in a fixed transverse range from one end (the front of FIGS. 1, 3, 6, 7, 9, 10, and 12, the lower end of FIGS. 2 and 11, and the left end of FIGS. 4, 5, and 8) to the other end. This direction represents the direction of gas flow. The projections 29, 29 are provided on the bottom face of the shallow indentation 26 which forms the passage 24. The projections 29 are provided in a range representing approximately 90% of the overall transverse length and most preferably, in 60 to 80% of the transverse length of the indentation 26.

The passage 24 comprises a large passage 31 with a large width in the region provided with projections 29, 29.

The distal end of each projection 29, 29 is soldered so that when the indentations of the first and second metal plates 22, 23 are assembled, the peripheral edges of the metal plates 22, 23 are facing. The contact sections of each projection 29 form a reinforcing section 45.

The lower face of the passage 24 is formed substantially as a flat face in the remaining section of the passage 24, that is to say, in a range of more than 10% of the overall transverse length, and most preferably in a range of 20–40% and where projections 29 are not provided. In regions without the projections 29, a corrugated inner fin 30 is disposed so that the direction of the waveform corresponds with the transverse direction of the passage 24. This region comprises a small passage group 33 formed from a plurality of small narrow passages 32, 32.

Figure 11:
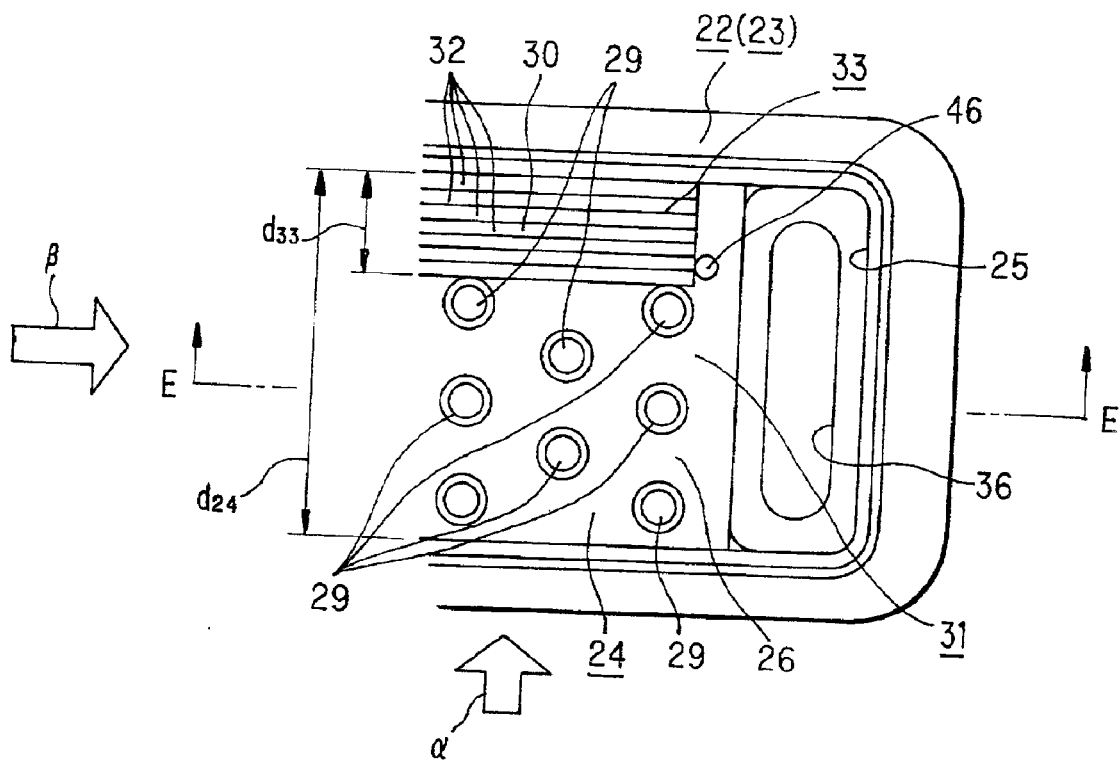
FIG. 11 shows an end of the core cut at a central section through a single heat transfer tube element.

In order to position the inner fin 30 in the passage 24, as shown in FIG. 11, a projection 46 is formed on the end of the shallow indentation 26 provided in the metal plate 22 (or 23).

As shown in FIG. 1, the core 12a provides an inlet tank 34 which is formed by connecting the first tanks 27 on one end of the laminated heat transfer tube elements 17. The second tanks 28 on the other side of each heat transfer tube element 17 are interconnected to form an outlet tank 35.

Figure 12:
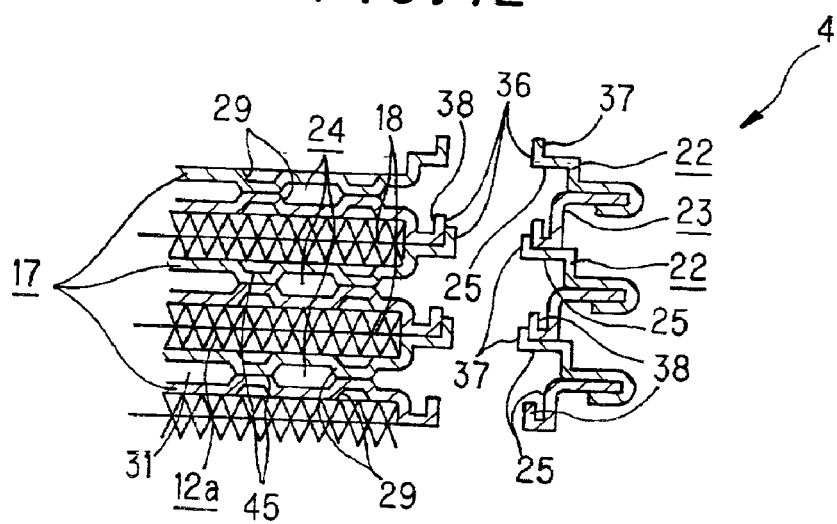
FIG. 12 is a sectional view along the line E—E of FIG. 11.

As shown in FIG. 6, in order to form the tanks 34, 35, in the first and second metal plates 22, 23 which form each heat transfer tube element 17, an elongated transverse through hole 36 is formed in the central section of each deep indentation 25, 25 of the upper first metal plate 22, as also shown in FIG. 12, an outward cylindrical section 37 projects towards the periphery of the through hole 36., further more as shown in FIGS. 6, 12, in the first and second metal plates 22, 23, an elongated transverse through hole 36 is formed in the central section of each deep indentation 25, 25 of the lower second metal plate 23. An inward cylindrical section 38 projects towards the periphery of the through hole 36.

In the vertically adjacent heat transfer tube elements 17, 17, the outward cylindrical sections 37 are engaged to the inner side of each inward cylindrical section 38. The outward cylindrical sections 37 are provided on the first metal plate 22 comprising the upper heat transfer tube elements 17 and the inward cylindrical sections 38 are provided on the second metal plate 23 comprising the lower heat transfer tube element 17

In this manner, a core 12a is formed by sequentially laminating a required number of heat transfer tube elements 17.

Figure 10:
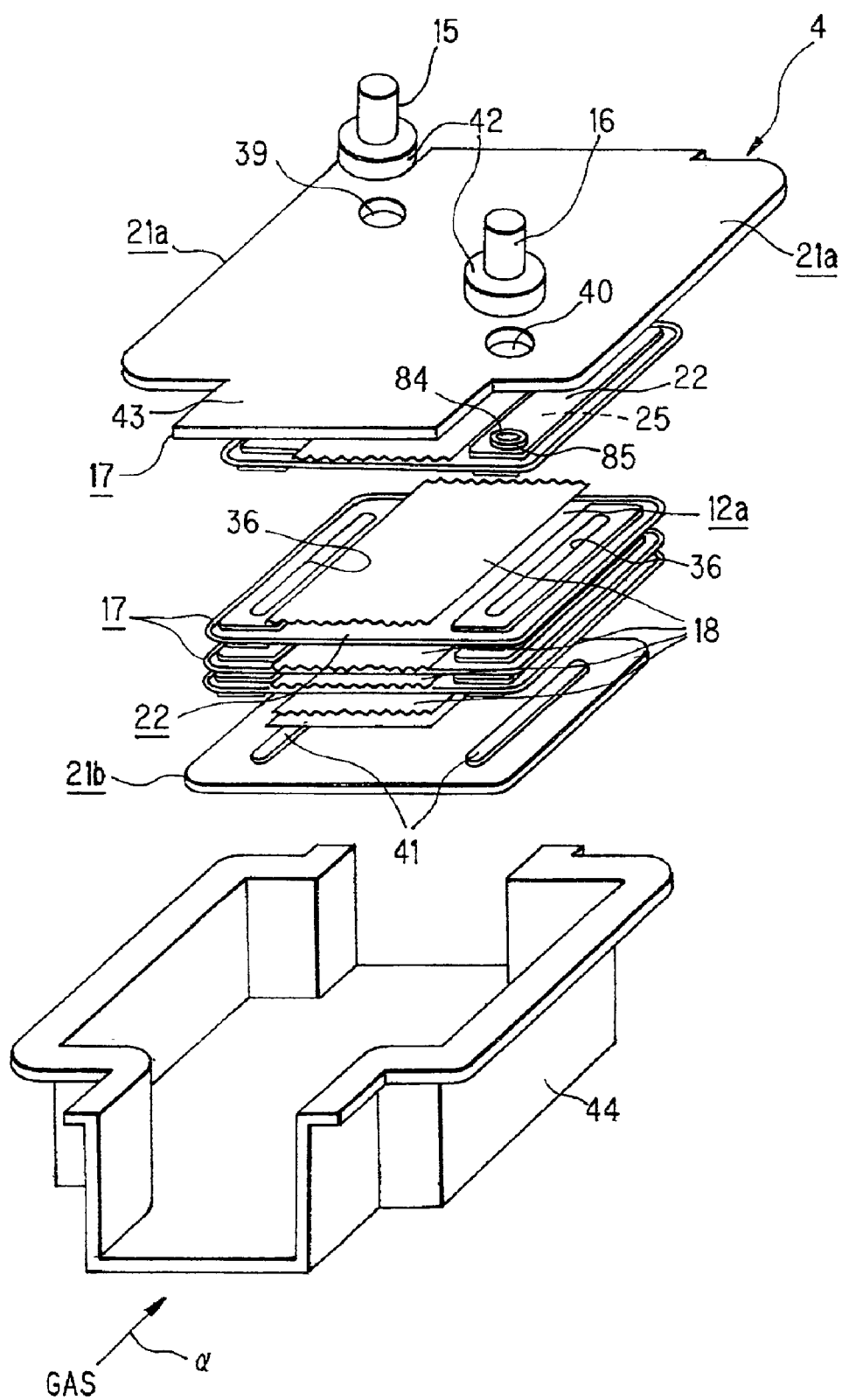
FIG. 10 is a schematic exploded perspective view of a first embodiment.

As shown in FIG. 10, inlet and outlet through holes 39, 40 are formed at separate positions along a substantially diagonal line of the heat transfer tube elements 17 on the upper side-plate 21a of the core 12a. Core 12a is laminated on the lower side of the upper side-plate 21a and outward cylindrical sections 85 are fitted into the inner side of the inlet and outlet through holes 39, 40. The outward cylindrical sections 85 are formed on the periphery of the circular through hole provided on the uppermost single-layer first metal plate 22 instead of the elongated through hole 36

In contrast, a pair of elongated transverse protrusions 41, 41 are provided on both ends of the side-plate 21b on the lower end of the core 12a and these-protrusions 41, 41 are engaged in the through holes 36, 36 provided on the lowermost second metal plate 23. This arrangement allows the lower end of each inlet and outlet tank 34, 35 to be covered in a water-tight manner by the lower side-plate 21b.

Consequently the cooling liquid which flows into the inlet tank 34 from the upper inlet through hole 39 in the core 12a flows in the parallel passages 24 in the heat transfer tube elements 17. The cooling liquid reaches the outlet tank 35 on the opposite side and is discharged to the outside from the upper outlet through hole 40.

The heat exchanger 4 of this invention is assembled from the first and second metal plates 22, 23, the inner fin 30, the composite fin 18, the pair of side-plates 21a, 21b, the cooling medium transfer pipe 15, the cooling medium extraction pipe 16 and the connecting members 42, 42. The connecting members 42, 42 connect the end of the cooling medium transfer pipe 15 and the cooling medium extraction pipe 16 with the upper surface of the upper side-plate 21a.

The assembled product is heated in a heating furnace and each member 22, 23, 30, 18, 21a, 21b, 15, 16, 42 is engaged by soldering. Thus the cooling medium transfer pipe 15 and cooling medium extraction pipe 16 connect through the inlet tank 34 and the outlet tank 35 through the inlet through hole 39 and the outlet through hole 40 which are respectively provided in the upper side-plate 21a.

In order to perform the soldering operation, the first and second metal plates 22, 23 which comprise each heat transfer tube element 17 are formed by plating layers of soldering containing large amounts of Ni onto both surfaces of a core member such as stainless steel plate. Alternatively, when metal plates 22, 23 simply comprising stainless steel plate, it is possible to coat solder of a paste-like consistency containing large amounts of Ni onto both surfaces of each metal plate 22, 23 and to sandwich solder foil between an outer fin and each surface. Each metal plate 22, 23 can also be formed by cladding solder (for example, 4004, 4343) onto an aluminum alloy (for example 3003).

Figure 2:
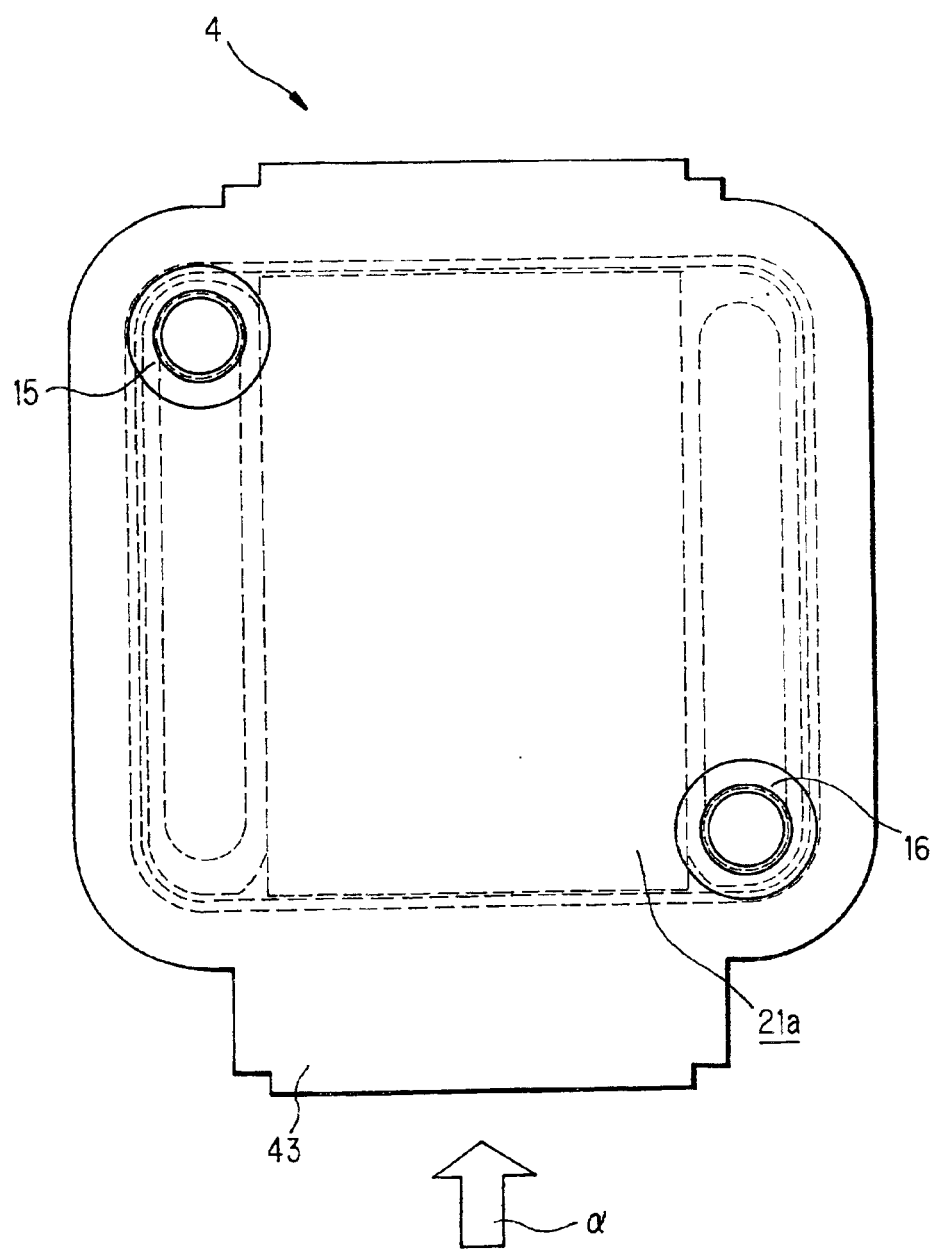
FIG. 2 is a plan view with a section omitted of a first embodiment of this invention.

As also shown in FIG. 2 or FIG. 10, a rectangular projecting piece 43 is formed on both the gas inlet and gas outlet end of the upper side-plate 21a. The projecting piece 43 forms a connecting section with piping (not shown) in order to transfer gas to the core 12a by assembly with a section of the case 44 which retains the core 12a.

The heat exchanger 4 in a fuel cell system as described above is disposed upstream of the carbon monoxide oxidizer or the catalytic heat exchanger. High-temperature reformate gas produced by a reformer flow in the direction α of the arrow in FIGS. 2, 4, 6, 11 in the inner section of the composite fin 18 between each heat transfer tube element 17 comprising the core 12a.

Relatively low-temperature cooling liquid is transferred to the inlet tank 34 from the cooling medium transfer pipe 15.

The cooling liquid transferred to the inlet tank 34 reaches the outlet tank 35 by flowing in the direction β of the arrow in FIGS. 6 and 11 in the plurality of passages provided in each heat transfer tube element 17. During this period, heat exchange is performed with the gas flowing in the composite fin 18.

The cooling liquid which reaches the outlet tank 35 is extracted to the outside through a cooling liquid extraction pipe 16 and returns to the inlet tank 34 once again after being cooled in another heat exchanger. The gas passing through the composite fin 18 of the core 12a is cooled by heat exchange.

Since the passage 24 in which the cooling liquid flows comprises a large passage 31 having a large width and a group of small passages 33 with a small width, it is possible to reduce non-uniformity in a transverse orientation of the temperature distribution of the gas flowing through the core 12a to a level which is negligible for practical purposes.

This reason for this effect of the invention will be described referring to FIG. 13 to FIG. 15.

These figures show the results of a simulation of the temperature distribution in the core 12a of the gas passing through the composite fin 18 between each heat transfer tube elements 17, 17 (refer to FIG. 1) and the cooling liquid passing through the passage 24 provided in each heat transfer tube element 17. The temperature distribution of the gas is shown in the figure by the section bounded by a solid line and the temperature distribution of the cooling liquid is shown by the section bounded by a broken line. The X-axis in the figure corresponds with the direction α of gas flow and the Y-axis corresponds with the direction β of flow of the cooling liquid.

Figure 13:
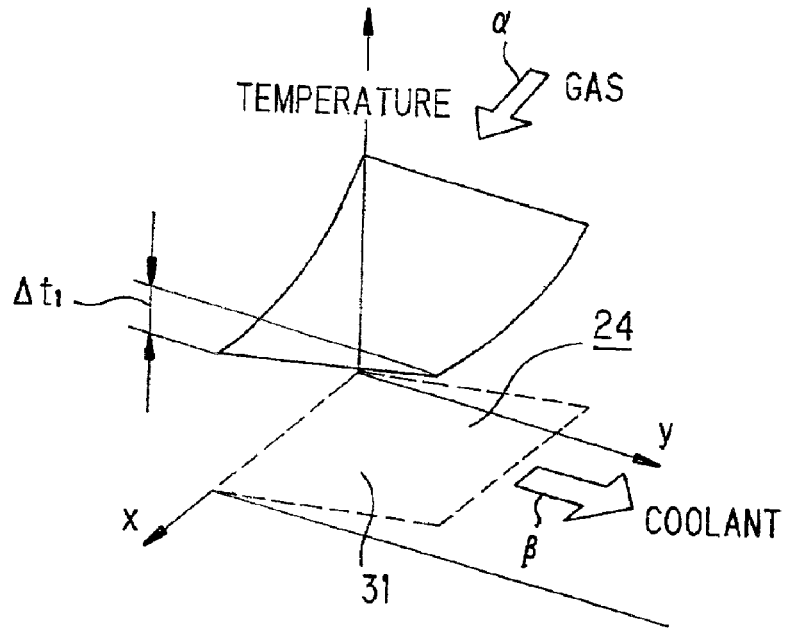
FIG. 13 shows the temperature distribution of a cooling liquid and a gas in the core when the entire passage provided in each heat transfer tube element is adapted as a large passage with a large width.

FIG. 13 shows the situation in which an inner fin 30 is not provided in the passage 24 allowing flow of the cooling liquid in each heat transfer tube element 17 and the whole of the passage 24 is adapted to form a large passage 31. FIG. 14 shows the situation in which an inner fin 30 is provided in the entire passage 24 and the entire passage 24 is adapted to form a group of small passages 33. In contrast, FIG. 15 shows the present invention in which the upper section of the passage 24 in the direction α of gas flow is adapted to form a large passage 31 and the lower section forms a group of small passages 33.

Firstly the temperature distribution of the cooling liquid as shown in FIG. 13 will be considered with respect to the cross-sectional area which is orthogonal to the direction β of flow of cooling liquid. Since the cooling liquid undergoes mixing in the passage 24 across the entire cross-sectional area (transverse direction), the temperature of the cooling liquid takes substantially the same value across the cross-sectional area. The cooling liquid performs heat exchange with the gas while flowing in direction β in the FIG. 13 and the temperature thereof increases uniformly in downstream sections as a result of absorption of heat from the gas.

On the other hand, the gas radiates heat into the cooling liquid as a result of heat exchange during flow in direction α in the figure after entering from the inlet. As a result, the gas temperature falls along the downstream section. The gas temperature falls in response to the temperature of the cooling liquid in each section performing heat exchange. That is to say, when the temperature of the cooling liquid performing heat exchange is relatively low, the decrease in the gas temperature increases. Conversely, when the temperature of the cooling liquid performing heat exchange is relatively high, the decrease in the gas temperature is reduced. Thus the temperature differential of the gas with respect to the direction β of flow of the cooling liquid at the gas outlet takes a large value $\Delta t1$ which means that the temperature distribution of the gas is not uniform.

Figure 14:
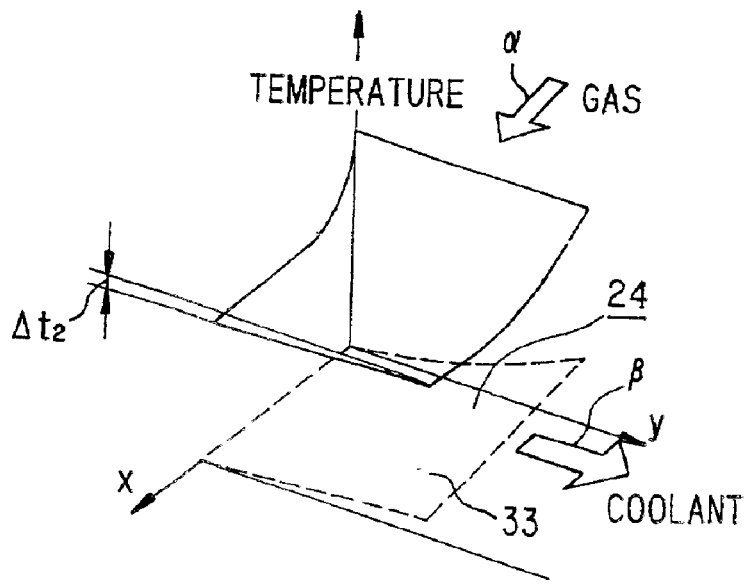
FIG. 14 shows the temperature distribution of a cooling liquid and a gas in the core when the entire passage provided in each heat transfer tube element is adapted as a group of small passages having a small width.

When the entire passage 24 is formed from a group of small passages 33 having a narrow width as shown in FIG. 14, all of the cooling liquid is not mixed in the cross-sectional area orthogonal to the direction β of flow of the cooling liquid. Consequently the temperature of the cooling liquid in this cross-sectional area is not always equal. Although the cooling liquid undergoes a temperature increase as a result of heat exchange with gas when flowing in direction β in FIG. 14, the degree of temperature increase is not uniform.

Consequently gas flowing upstream in direction β of the flow direction of the cooling liquid undergoes active heat exchange with the cooling liquid when flowing in direction α in the figure from the inlet and undergoes a rapid temperature decrease.

However heat exchange between this gas and the cooling liquid decreases towards the outlet due to the small temperature differential with the cooling liquid in downstream sections in the direction of flow.

Furthermore the cooling liquid flowing downstream with respect to the gas flow flows in direction β at a relatively low temperature in comparison to the&cooling liquid flowing upstream with respect to the gas flow. Thus gas flowing downstream with respect to the flow of cooling liquid undergoes low levels of heat exchange due to the high temperature of the cooling liquid at the inlet. However the level of heat exchange increases due to the relatively low temperature of the cooling liquid in downstream sections in the direction of gas flow. As a result, the temperature differential Δt2 in direction β at the gas outlet is small and the non-uniformity in the temperature distribution can be suppressed to a sufficient degree.

In the above manner, non-uniformity in the temperature distribution of the gas passing through the core 12a can be sufficiently suppressed by making the entire passage 24 into a group of small passages 33. However this requires that an inner fin 30 is provided in the entire section of the passage 24 in order to form the group of small passages 33. As a result, the weight of the heat exchanger 4 is increased and its structure becomes complicated.

Figure 15:
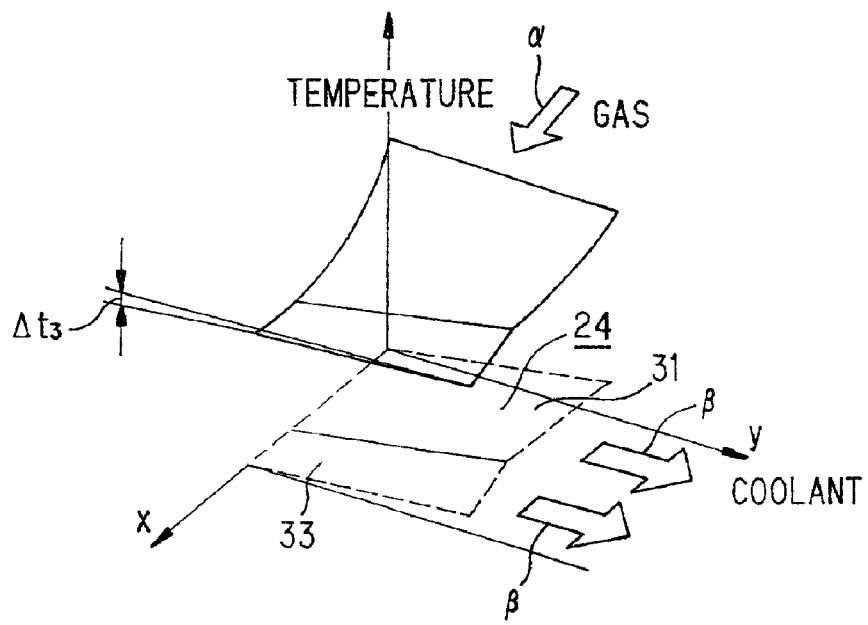
FIG. 15 shows the temperature distribution of a cooling liquid and a gas in the core when the passage provided in each heat transfer tube element comprises a large passage and a group of small passages.

In this invention as shown in FIG. 15, the passage 24 is provided with a large upstream passage 31 in the direction α of gas flow and a group of small passages 33 having a small width provided downstream with respect to the direction α of gas flow. Thus in this invention, although the gas displays a non-uniform temperature distribution in upstream sections in direction α as a result of the same reason as that shown in FIG. 13, it is possible to suppress the temperature distribution in downstream sections to a low level due to the same reason as that shown in FIG. 14.

In this case, the temperature differential Δt3 of gas in the direction of flow of cooling liquid becomes slightly higher at the outlet of the core 12a in comparison to FIG. 14. However the difference of Δt3 and Δt2 is not of a dimension which is negligible for practical purposes and consequently the non-uniformity in the temperature distribution of gas passing through the core 12a is suppressed to a level which is negligible for practical purposes.

As a result, when gas output from the heat exchanger 4 is transferred to the catalytic heat exchanger or the carbon monoxide oxidizer, the homogenous temperature distribution allows efficient removal carbon monoxide.

Although this invention adapts a section of the passage 24 to be a large passage 31, a reinforcing section 45 is formed by projecting a plurality of projections 29 in the large passage 31. Thus it is possible to maintain the pressure resisting strength of each heat transfer tube element 17 with the plurality of reinforcing sections 45. As a result, the strength of each heat transfer tube element 17 can be maintained without increasing in the size or weight of the heat exchanger as a result of increasing the thickness of the plate member comprising each heat transfer tube element 17 or providing a reinforcing sections on the outer section of each heat transfer tube element 17.

But when the passage 24 provided in the heat transfer tube element 17 has a group of small passages 33 provided upstream in the direction of gas flow and a large passage 31 further downstream than the group of small passages 33 in the direction of gas flow, non-uniformity in the temperature distribution increases in downstream sections of gas. Thus the temperature distribution of gas output from the heat exchanger 4 increases and it is not possible to remove carbon monoxide contained in the gas in an efficient manner.

Furthermore in this embodiment, the width d33 of the group of small passages 33 in the passage 24 is greater than or equal to 10% of the overall transverse width d24 of the passage 24 and preferably to 20–40%. Even when the flow amount of cooling liquid flowing in the passage 24 decreases during operation, the temperature of gas flowing in the core 12a is easily maintained to an appropriate range. That is to say, irrespective of fluctuations in the flow amount of the cooling liquid, maintenance of preferred performance characteristics is facilitated. Thus even when the operating conditions undergo frequent variation, it is possible to maintain stable cooling characteristics on the gas.

The experimental results conducted by the inventors in order to confirm the effect of this invention will be described hereafter referring to FIG. 16. In these experiments, the temperature distribution of the upstream section and the downstream section of gas flowing in the heat exchanger 4 in the direction of cooling liquid flow were measured. The measurements were conducted on the ratio of the large passage 31 to the group of small passages 33 in the entire passage 24 with respect to three types of cooling liquid flow amounts (a reference value, and 50% and 25% of the reference value).

Figure 16:
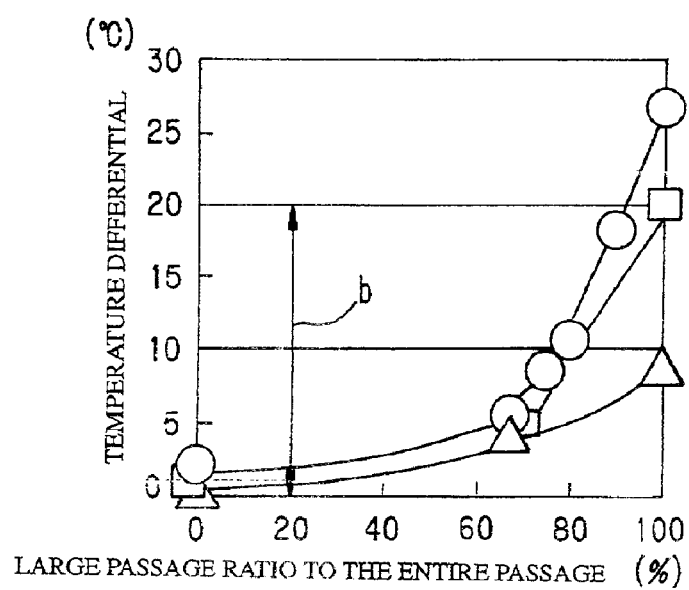
FIG. 16 shows experimental results confirming the effect of the first embodiment.

In FIG. 16, the horizontal axis shows ratio of the large passage 31 in the entire passage 24 and the vertical axis shows the temperature differential on both ends in a direction orthogonal to the direction of flow of gas at the outlet of the heat exchanger. Furthermore the sign Δ shows a reference value for a sufficient flow amount of cooling liquid, the sign □ shows 50% of the reference value for the flow amount of cooling liquid and the sign ○ shows 25% thereof.

In this fuel cell system, a temperature distribution of reformate gas transferred into the catalytic heat exchanger or the carbon monoxide oxidizer in a range±10° C. of a reference temperature (the range designated by b) represents a normal region in which problems do not arise with respect to reactions for reducing carbon monoxide in the reformate gas.

As clearly shown by the experimental results in FIG. 16, when the flow amount of cooling liquid takes the reference value or 50% thereof, the temperature distribution at the gas outlet does not deviate from the normal region when the small passage group 33 is not provided, that is to say, when the ratio of the large passage 31 is 100% . However at 25% of the reference value of the flow amount of cooling liquid, the temperature distribution at the gas outlet deviates from the normal region when the ratio of the small passage group is less than 10% , that is to say, the ratio of the large passage 31 exceeds 90%.

At 25% of the flow amount reference value, the effect of reducing the temperature distribution at the gas outlet undergoes almost no variation even when the ratio of the small passage group 33 is greater than 40% , that is to say, the ratio of the large passage 31 is smaller than 60% .

For reasons of efficiency and economy, it is preferred that the ratio of the small passage group 33 in the passage 24 is 20–40% in this invention.

A second embodiment of this invention will be described referring to FIGS. 17–22.

This embodiment comprises a catalytic heat exchanger 10a which removes toxic carbon monoxide from the reformate gas and cools the heated gases.

Figure 18:
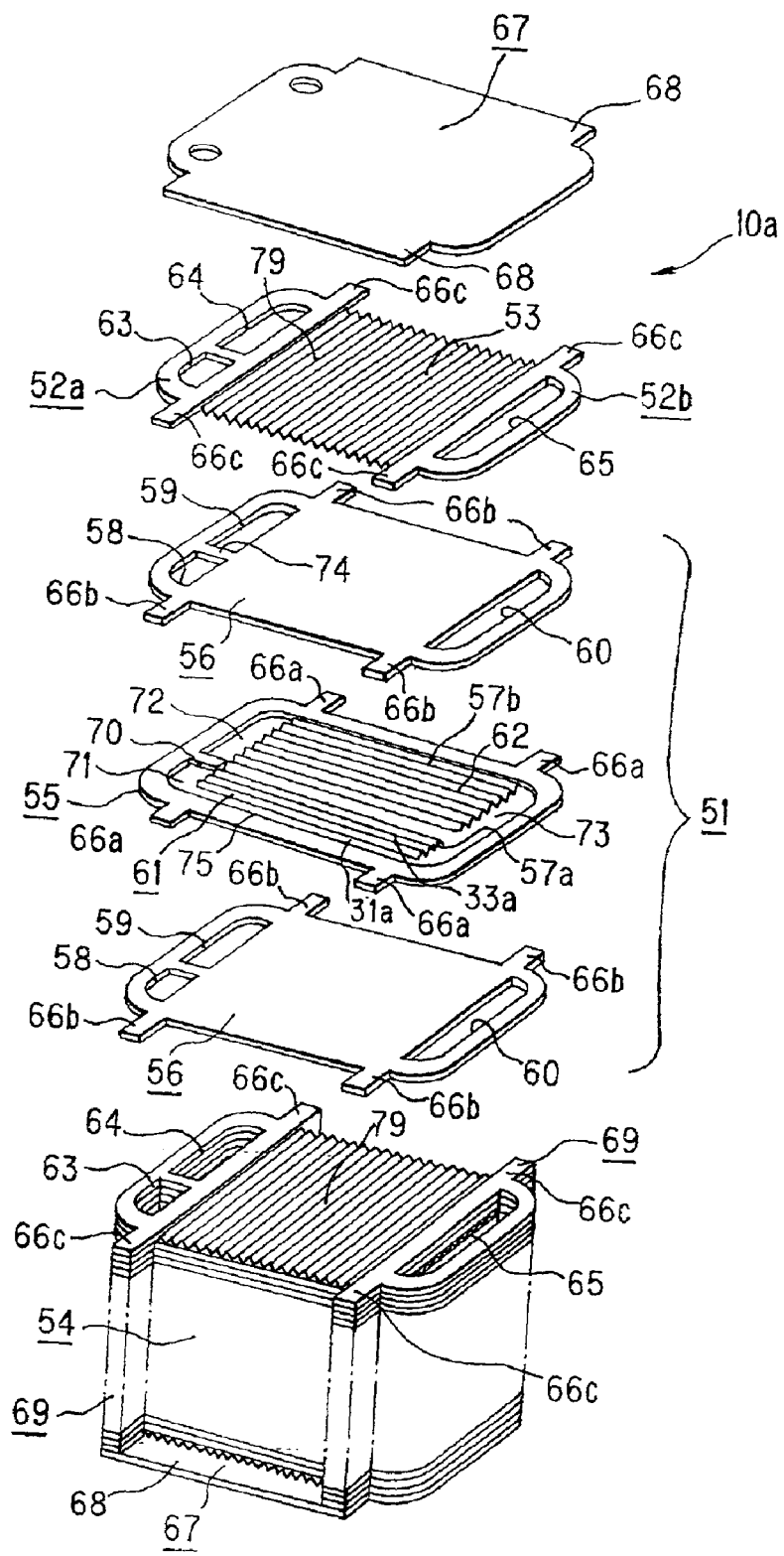
FIG. 18 is a perspective view with an exploded section of the second embodiment of this invention.

As shown in FIG. 18, a core 54 is sequentially formed by laminating a plurality of heat transfer tube elements 51, 51 with corrugated outer fins 53 interposed therebetween. The heat transfer tube elements 51 comprise an flat passage allowing flow of cooling liquid (for example 100% ethylene glycol). A pair of first metal plates 52a, 52b is disposed on both side of the outer fin 53.

The heat transfer tube elements 51 comprises a pair of corrugated inner fins 57a, 57b in a space on the inner side of the second metal plate 55 which forms a frame. Both surfaces of the fins 57a, 57b are sandwiched by a pair of partitioning plates 56, 56 comprising thin flat plates. The transverse dimensions of the inner fin 57a is smaller than the transverse dimensions of the other inner fin 57b.

A projection 70 projecting inwardly is formed on the central section of one lateral section (the left side of FIGS. 17–19, 21) of the second metal plate 55. One edge (the left edge of FIGS. 17–19, 21) of each inner fin 57a, 57b is positioned by abutment with the distal end face of the projection 70. The spaces partitioned by the projection 70 between the inner left face of the second metal plate 55 and the left edge of the inner fins 57a, 57b comprise a first and second inner space 71, 72.

The space partitioned between the right edge of the inner fins 57a, 57b and the opposite side of the inner face (the right side of FIGS. 17–19, 21) of the second metal plate 55 comprises a third inner space 73.

The partitioning plates 56 are provided with first and second through holes 58, 59 in sections respectively corresponding to the first and second inner spaces 71, 72 and an elongated third through hole 60 in a section corresponding to the third inner space 73. The partition 74 between the first and second through holes 58, 59 of each partitioning plate 56 is provided at a position corresponding to the projection 70 provided in each second metal plate 55.

An oblong upstream cooling medium passage 61 and a downstream cooling medium passage 62 are provided in order to allow flow of cooling liquid between the inner fins 57a, 57b and both faces of the partitioning plates 56, 56.

The upstream cooling medium passage 61 connects the first inner space 71 with the third inner space 73. The downstream cooling medium passage 62 connects the second inner space 72 with the third inner space 73.

The upstream cooling medium passage 61 is provided upstream of the core 54 with respect to the direction α of gas flow.

Figure 19:
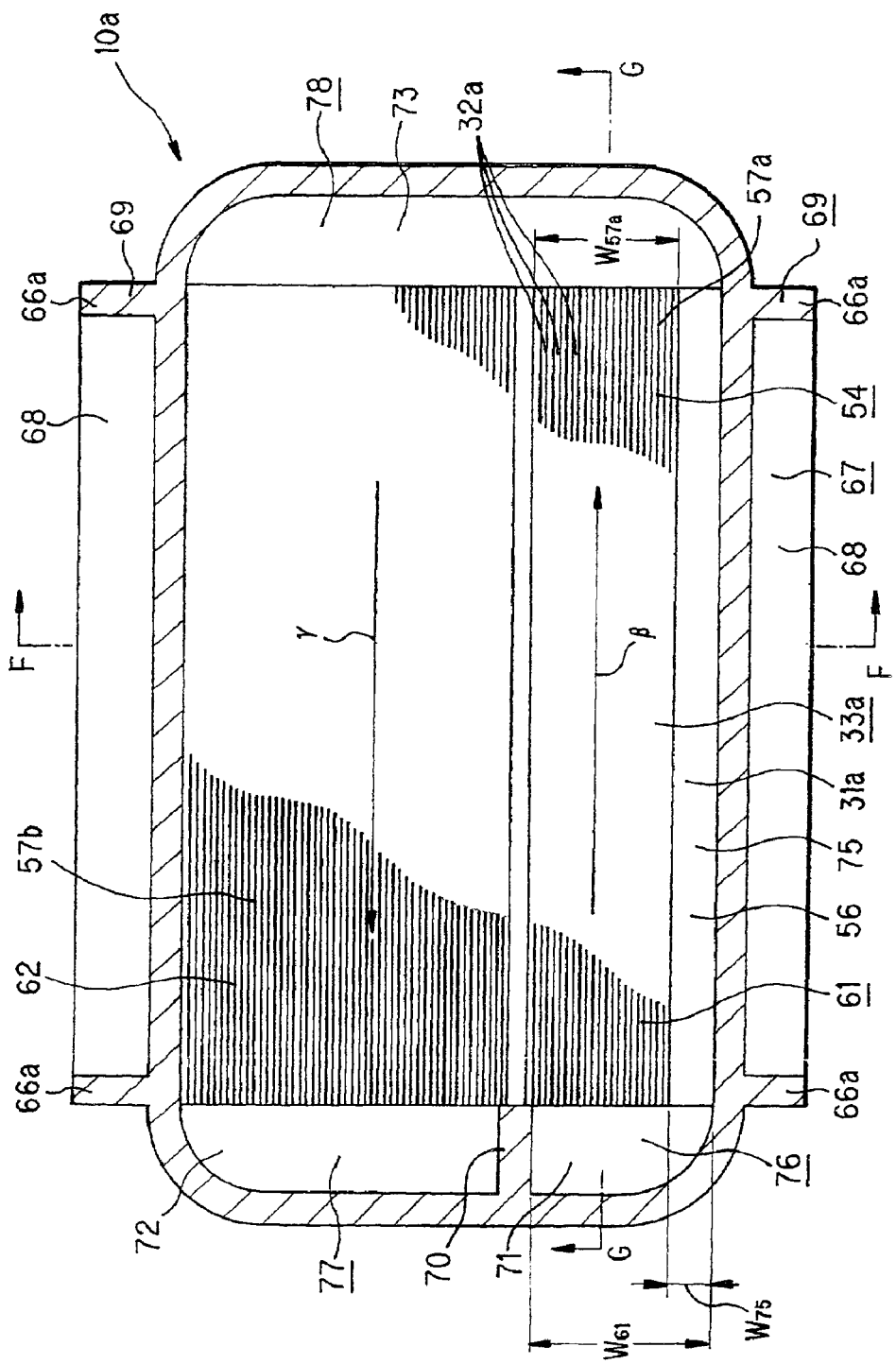
FIG. 19 is a plan view of a second metal plate seen from above FIG. 17.

As shown in FIG. 19, the upstream cooling medium passage 61 has transverse dimensions W61 in a direction of gas flow of 25–30 mm. The transverse dimensions W57a of one inner fin 57a provided in the upstream cooling medium passage 61 are smaller by a predetermined amount than the transverse dimensions W61 of the upstream cooling medium passage 61. Those sections without an inner fin 57a comprise a space 75. The transverse dimensions W75 of the space 75 are 5 mm.

Consequently in this embodiment, the section comprising the space 75 in the upstream cooling medium passage 61 represents a large passage 31a and those sections provided with an inner fin 57a are a small passage group 33a comprising a plurality of small passages 32a.

The overall transverse width of the core 54 is sufficiently greater than 30 mm.

As shown above, a pair of first metal plates 52a. 52b are laminated on both surfaces of the heat transfer tube elements 51. The outer shape of the first metal plates 52a, 52b has the same shape as the right and left of each partitioning plate 56.

Fourth and fifth through holes 63, 64 are formed in the first metal plate 52a. The through holes 63, 64 have the same shape at positions corresponding to the first and second through holes 58, 59 provided on one end of each partitioning plate 56. A sixth through hole 65 is similarly formed in the first metal plate 52b corresponding to the third through hole 60.

An outer fin 53 is disposed on an inner section of both first metal plates 52a, 52b with a pair of first metal plates 52a, 52b being sandwiched between adjacent heat transfer tube elements 51, 51. An oxidizing catalyst is attached to both surfaces of each outer fin 53 in order to promote reactions between carbon monoxide and oxygen. In this manner, carbon monoxide in gas is oxidized as gas flow on both surfaces of the outer fin 53.

A rectangular projecting piece 66a is formed at two positions on both transverse end faces of the second metal plate 55.

Projections 66b, 66b having the same shape are formed at four positions on the partitioning plate 56 corresponding to the projecting pieces 66a, 66a provided on the second metal plate 55. In the same way, a pair of projecting pieces 66c, 66c of the same shape are formed on each first metal plate 52a.

When manufacturing a catalytic heat converter 10a according to this invention, a required number of first and second metal plates 52a, 52b, 55, partitioning plates 56, inner fins 57a, 57b and outer fins 53 with pre-applied catalyst are laminated. A pair of side-plates 67, 67, a cooling medium transfer pipe 49 and a cooling medium extraction pipe 50 are disposed on both sides of the above unit in order to complete assembly. The assembled unit is heated in a heating furnace and each member 49, 50, 52a, 52b, 53, 55, 56, 57a, 57b, 67 is integrated by soldering.

The various projecting pieces 66a–66c of the first and second metal plates 52a, 52b, 55 and the dividing plates 56, 56 are laminated. Onto this arrangement, a pair of outer sections 68, 68 provided on both transverse ends of each side-plate 67, 67 are laminated and positioned.

In order to perform the soldering process above, the first metal plates 52a, 52b, the second metal plate 55 and each partitioning plate 56, 56 comprise a member coated with solder containing large amounts of Ni on both surfaces of a core comprising stainless steel plate, or a member with solder of a paste-like consistency containing large amounts of Ni painted on both surfaces of a stainless steel plate. Alternatively, when laminating members 52a, 52b, 55, 56 simply comprising stainless steel plate, it is possible to sandwich solder foil between the respective members 52a, 52b, 55, 56. After soldering process, catalyst coating is applied to the outer fins 53.

In a core 54 manufactured as outlined above, the fourth and fifth through holes 63, 64 provided in the first metal plate 52a, the first and second through holes 58, 59 provided in the partitioning plate 56, 56 and the first and second inner spaces 71, 72 provided in the second metal plate 55 are interconnected in order to form an inlet tank 76 and an outlet tank 77.

The sixth through hole 65 provided in the first metal plate 52b, the third through hole 60 provided in the partitioning plate 56 and the third inner space 73 of the second metal plate 55 are interconnected in order to form an intermediate tank 78.

Figure 17:
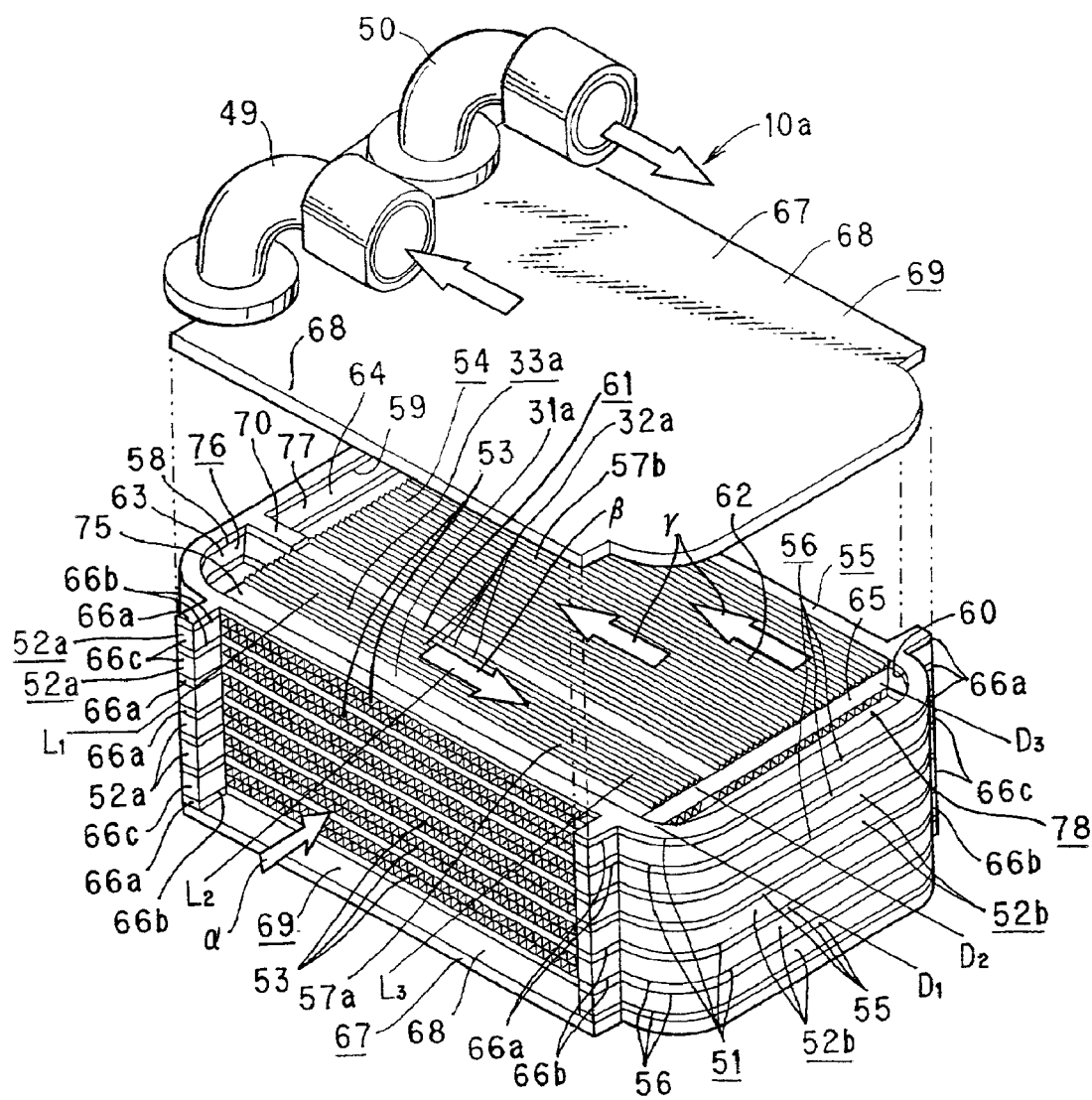
FIG. 17 is a perspective view with a section omitted of a second embodiment of this invention.

As shown in FIG. 17, the cooling medium transfer pipe 49 is connected to the upper end of the inlet tank 76 and the cooling medium extraction pipe 50 is connected to the upper end of the outlet tank 77.

Figure 20:
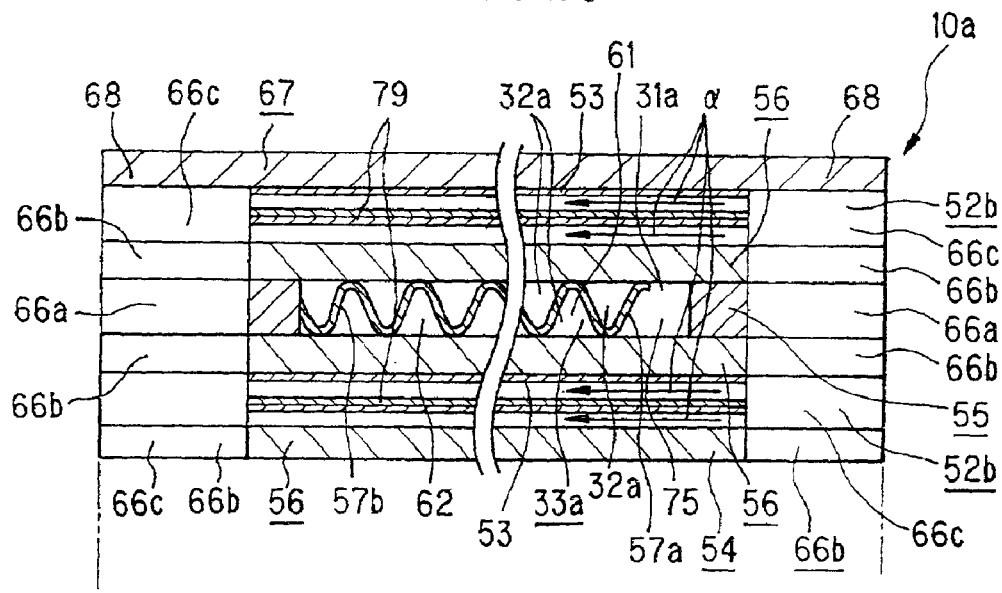
FIG. 20 is a sectional view along the line F—F in FIG. 19.
Figure 21:
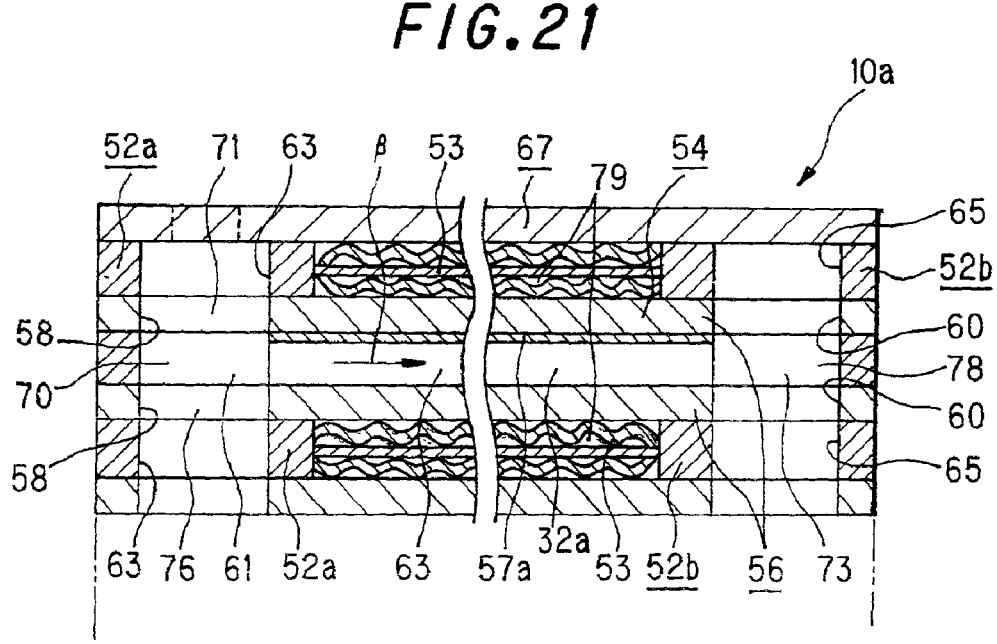
FIG. 21 is a sectional view along the line G–F in FIG. 19.
Figure 22:
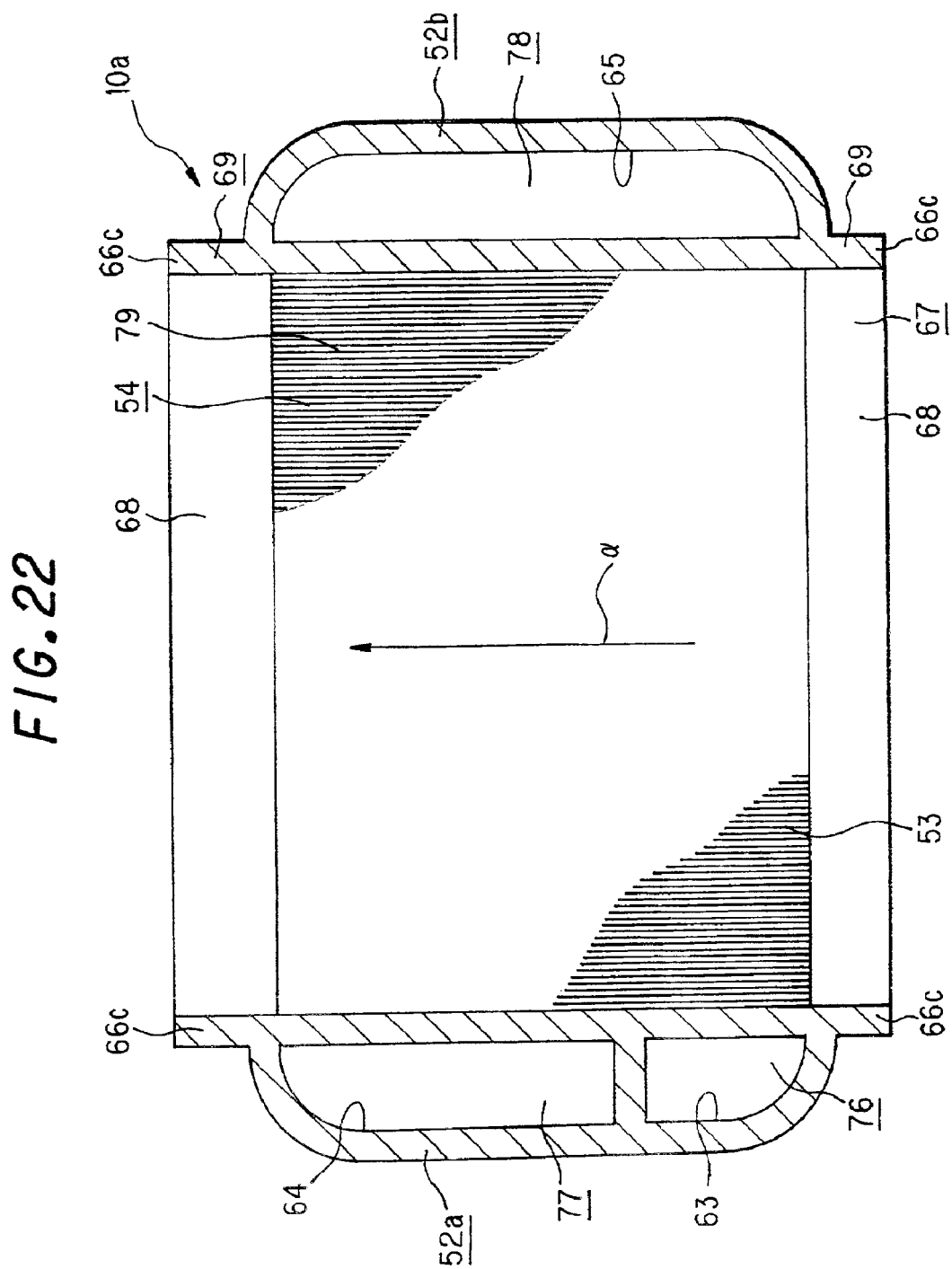
FIG. 22 is a plan view of a first metal plate seen from above FIG. 17.

Reformate gas at a relatively high temperature which contains hydrogen and carbon monoxide flows in the direction α of the arrow in FIGS. 17, 20 and 22 along both surfaces of the outer fin 53 of the outer section of each heat transfer tube elements 51, 51 comprising the core 54.

The cooling liquid passes through the cooling medium transfer pipe 49 and enters the inlet tank 76. The cooling liquid which is transferred to the inlet tank 76 reaches the intermediate tank 78 after flowing in the direction β of the arrow in FIGS. 17, 19 and 21 through the plurality of upstream cooling medium passages 61 provided in each heat transfer tube element 51 and performs heat exchange with gas flowing on the outside of each heat transfer tube element 51. The cooling liquid which reaches the intermediate tank 78 flows lengthwise in the intermediate tank 78 and thereafter flows in the direction γ in FIGS. 17 and 19, which is the opposite direction to the direction β of the arrow. The cooling liquid flows through the plurality of downstream cooling medium passages 62, 62 provided in each heat transfer tube elements 51, 51 while performing heat exchange and finally reaches the outlet tank 77.

According to this invention, the upstream cooling medium passage 61 provided in each heat transfer tube element 51 comprises a large passage 31a provided upstream with respect to the direction α of gas flow and a small passage group 33a comprising a plurality of small passages 32a having a smaller width than the large passage 31a which is provided in a downstream section. Thus in the same manner as the first embodiment, it is possible to suppress non-uniformity in the temperature distribution of the gas passing through the core 54 to a level which is negligible for practical purposes with a small light-weight and low-cost solution.

Furthermore even in the case that the gas immediately before passing through the core 54 has a high temperature, the gas and the outer fin 53 are cooled and it is possible to prevent the temperature of the catalyst provided in each outer fin 53 from becoming excessively high.

Since the flow of cooling liquid is repeated an odd number of times (one occasion) in an opposite direction in the heat transfer tube elements 51, it is possible to place the passages in adjacent positions across the transverse direction of the core 54 corresponding to the direction α of gas flow. These passages are the passage in which relatively low-temperature cooling liquid flows immediately after leaving the inlet tank 76, the passage in which relatively high-temperature cooling liquid flows immediately before entering the outlet tank 77, and the passage in which intermediate temperature cooling liquid flow immediately after leaving and immediately before entering the intermediate tank 78. Consequently the temperature distribution of gas flowing in the core 54 can be further homogenized with respect to the lengthwise direction (directions β and γ) of the core 54.

Decreasing the width of the upstream cooling medium passage 61 and the downstream cooling medium passage 62 enables an increase in the flow speed of cooling medium in each passage 61 and thus improves the heat exchanging performance of the cooling liquid between the catalyst and the gas. In this manner, the temperature of the catalyst and the gas can be easily maintained to an optimal range for facilitating reactions between the catalyst and the gas and a preferred removal rate of carbon monoxide contained in the gas can be maintained.

Moreover since it is possible to homogenize the gas temperature without lengthening (the length in the direction α) the gas passage 79 formed between adjacent heat transfer tube elements 51, 51, oxygen required for reactions is not insufficient along the gas passage 79.

Furthermore the present inventors conducted experiments using a catalytic heat exchanger with a core width (in a direction α) of 180 mm, a core length (in a direction β) of 120 mm and a core thickness of 120 mm. The results of these experiments show that the gas temperature is increased by heat of reactions as gas flows downstream in each gas passage 79 in a range in which the length of the gas passage 79 on both sides of each outer fin 53 and between adjacent heat transfer tube elements 51, 51 does not exceed approximately 30 mm.

Consequently when the transverse length of the core 54 is sufficiently greater than 30 mm as in this embodiment, the temperature of gas further upstream than transverse central section of the core 54 increases to the greatest degree. Thus for the above reasons, when upstream cooling passages 61 are provided in this embodiment which are upstream of the core 54 in the direction α of gas flow, heat exchange tends to occur between maximum temperature gas further upstream than the transverse central section of the core 54 and the relatively low-temperature cooling liquid flowing in each upstream cooling medium passage 61.

In particular, since the width W61 of each upstream cooling passage 61 has a value of 25–30 mm, the temperature of the catalyst and the gas flowing in the core 54 does not exceed a predetermined range facilitating reactions between the gas and the catalyst. In contrast, when the width of each upstream cooling medium passage 61 is greater than 30 mm, the flow speed of cooling liquid flowing in each upstream cooling medium passage 61 is reduced and sufficient heat exchange between the high-temperature gas flowing in the core 54 and the cooling medium is not performed which results in the possibility that the temperature of the gas and the catalyst will undergo an excessive increase.

Conversely when the width of each upstream cooling medium passage 61 is smaller than 25 mm, heat exchange between maximum temperature gas in the gas passage 79 and relatively low-temperature cooling liquid flowing in the upstream cooling medium passage 61 is not performed resulting in the possibility of temperature increases.

However in this embodiment, since the width W61 of each upstream cooling medium passage 61 is set in a range of 25–30 mm, it is possible to reduce the temperature of the catalyst and the gas flowing in the core 54 to a predetermined range.

In the upstream cooling medium passage 61 which is the passage furthest upstream allowing flow of cooling liquid flow, the inner fin 57a is provided only in a range to a downstream end from the central section with respect to the direction α of gas flow. As a consequence, upstream sections with respect to the direction α of gas flow comprise a space 75. Since no inner fin 57a is provided in the space 75, heat exchange is not sufficiently performed between the gas flowing in the core 54 and the cooling liquid flowing in the space 75. Thus even when the gas temperature immediately before flowing through the core 54 is lower than the lower limit of the predetermined range in which reactions tend to occur between the gas and the catalyst, it is possible to immediately increase the temperature of the gas to the predetermined range using the heat of reactions immediately after the gas flows into the gas passage 79.

Heat exchange is sufficiently performed between gas and cooling medium in sections of the upstream cooling medium passage 61 where the cooling medium flows through sections provided with an inner fin 57a. Therefore after increasing the temperature of the gas in the above manner, the gas temperature is further increased by reactions between the gas and the catalyst. This facilitates preventing the temperature from exceeding the upper limit of the predetermined range.

These results allow the temperature of the catalyst and the gas to be maintained to the predetermined range and enables efficient reactions for removing carbon monoxide from the gas. Moreover non-uniformity in the longitudinal temperature distribution in the core 54 of gas passing through the core 54 can be reduced to a low level.

In this embodiment, it is also possible to use a section of the member comprising the upstream and downstream passages 61, 62 in order to form the inlet tank 76 distributing cooling liquid to the upstream cooling medium passage 61 and the outlet tank 77 which collects cooling liquid from the downstream cooling liquid 61. This allows cost reductions in the manufacture of a small high-performance catalytic heat exchanger 10a.

Next the results of comparative experiments conducted by the inventors of this invention in order to confirm the results of the second embodiment will be described. The experiments were performed using a catalytic heat exchanger according to this invention and a catalytic heat exchanger of the same dimensions but having a cooling passage of a different construction.

The flow of cooling liquid flowing in each heat transfer tube element 51 in the catalytic heat exchanger used for the purposes of comparison is generally unidirectional and only flows in the direction β of the arrow in FIG. 17 in contrast to the U-turn performed in the device employed in this invention. That is to say, in contrast to this invention, the cooling passage is not divided into an upstream cooling medium passage 61 and a downstream cooling medium passage 62.

These experiments were performed under the same conditions by measuring the temperature of the cooling liquid and gas flowing through the core 54. The results of these measurements are shown in FIG. 23.

Figure 23:
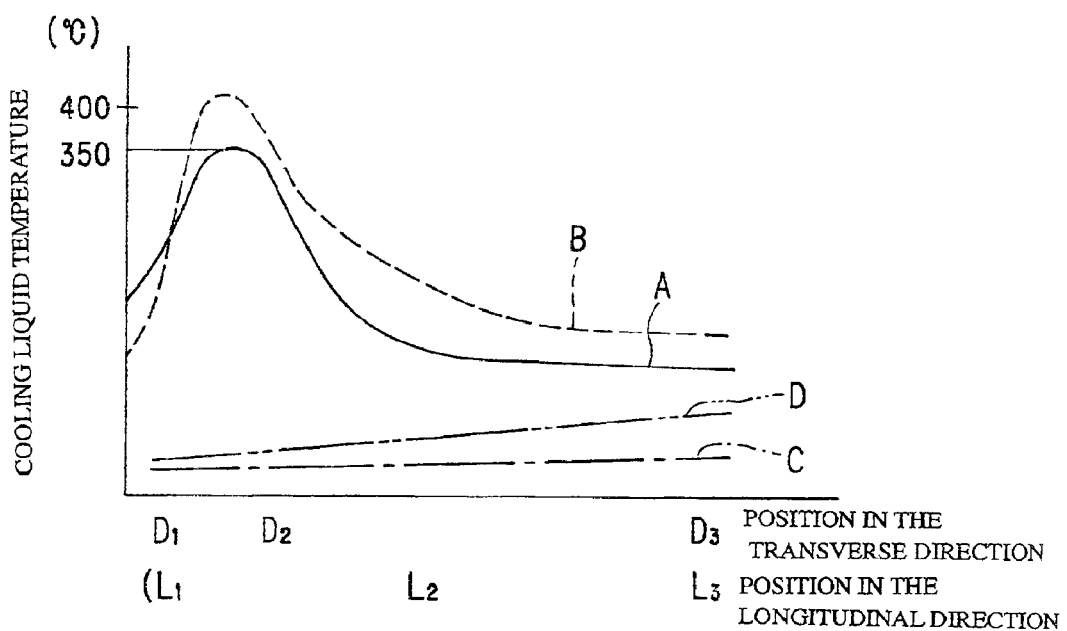
FIG. 23 shows measurement results of the temperature of gas passing through- the core and the temperature of cooling liquid flowing in each heat transfer tube element, the measurements conducted in order to confirm the effect of the second embodiment.

In FIG. 23, on the horizontal axis, D shows a position in the transverse direction (direction α) of the core 54 and L shows a position in the longitudinal direction (direction β) of the core 54. The vertical axis shows the temperature of cooling liquid flowing through the core 54. D1–D3 in the transverse position of the core 54 correspond to the positions shown in FIG. 17. The solid line A shows the temperature of the gas in the heat exchanger according to this invention and the broken line B shows the temperature of gas in the comparative example of a heat exchanger.

The temperature of cooling liquid flowing in predetermined sections (the sections shown by L1–L3 in FIG. 17) with respect to the longitudinal axis of the core 54 is shown by a single dotted line with respect to a heat exchanger according to this invention and by a double dotted line with respect to the comparative example.

As clearly shown in the experimental results shown in FIG. 23, this invention facilitates rapid increases in the gas temperature to a predetermined range immediately after the gas flows into the gas passage 79. The rapid increase in the gas temperature is enabled even when the gas temperature immediately before flowing into the gas passage 79 formed between adjacent heat transfer tube elements 51 is lower than the lower limit of a predetermined range at which reactions tend to occur between the catalyst and the gas. Moreover the maximum and average temperatures of the gas can be reduced to a lower value than the comparative example. Thus in this invention, it is possible to remove carbon monoxide in the gas more efficiently than the comparative example of a heat exchanger and to facilitate control of the gas temperature after these reactions to a relatively low predetermined temperature range.

This invention is not limited to the above embodiments and various changes and modifications may be made to the invention without departing from the spirit and scope thereof.

What is claimed is

1. A heat exchanger for use in a fuel cell system, the heat exchanger comprising:

heat transfer tube elements having a flat passage allowing flow of a cooling medium therein;

outer fins retained adjacent the heat transfer tube elements allowing flow of a gas there through; and a core formed by laminating the heat transfer tube elements and the outer fins in order; wherein the gas flows through the outer fins in a direction orthogonal to the direction of cooling medium flow which flows in the passage in each heat transfer tube element; and a passage in at least a section of the passage for cooling medium provided in each heat transfer tube element comprising a large passage and a small passage group disposed in parallel, the large passage having a large width and being provided upstream to the core with respect to the direction of gas flow, and the small passage group comprising a plurality of small passages being narrower than the large passage and being provided downstream of the core with respect to the direction of gas flow; wherein the small passage group has a width corresponding to 20–40% of a total width of the cooling medium passage.

2. The heat exchanger as defined in claim 1, wherein the small passage group is formed by disposing corrugated inner fins in the cooling medium passage.

3. The heat exchanger as defined in claim 1, further comprising:

an inlet tank connected with the inlet of the cooling medium passage provided on one end of the heat transfer tube elements, and an outlet tank connected with the outlet of the cooling medium passage provided on the other end of the heat transfer tube elements.

4. The heat exchanger as defined in claim 3, wherein the inlet tank and the outlet tank are formed in a section of the heat transfer tube elements by a through hole provided in a direction orthogonal to the direction of cooling medium flow.

5. The heat exchanger as defined in claim 1, wherein the direction of cooling medium flow inverts after flowing through a section of the cooling medium passage from one longitudinal end of the heat transfer tube elements to the other longitudinal end, and flows in the opposite direction to the above by flowing through the other cooling medium passage from one longitudinal end of the heat transfer tube elements to the other longitudinal end.

6. The heat exchanger as defined in claim 5, wherein an inlet tank connected to the inlet of a section of the cooling medium passage and an outlet tank connected to the outlet of the remaining cooling medium passage are disposed adjacently on one end of the heat transfer tube elements, and an intermediate tank connected with the entire cooling medium passage is disposed on the other end of the heat transfer tube elements.

7. The heat exchanger as defined in claim 6, wherein the intermediate tank, the inlet tank and the outlet tank are formed in a section of the heat transfer tube elements by a through hole provided in a direction orthogonal to the direction of cooling medium flow.

8. The heat exchanger as defined in claim 6, wherein the cooling medium passage connected to the inlet tank is disposed upstream of the core with respect to the direction of gas flow.

9. The heat exchanger as defined in claim 8, wherein a large passage and a small passage group are disposed in parallel in the cooling medium passage disposed upstream.

10. The heat exchanger as defined in claim 1, wherein at least one face of the outer fin is coated with a catalyst.

11. The heat exchanger as defined in claim 1, wherein the small passages of the small passage group are adjacent each other.

12. The heat exchanger as defined in claim 1, wherein all of the small passages of the small passage group are provided downstream of the core with respect to the direction of gas flow.

13. The heat exchanger as defined in claim 1, wherein the large passage comprises a plurality of projections which are formed on a bottom face of the large passage.

* * * * *